Oct. 4, 1966   H. T. DRAUDT   3,276,826
BEARING SEAL
Filed Oct. 23, 1963
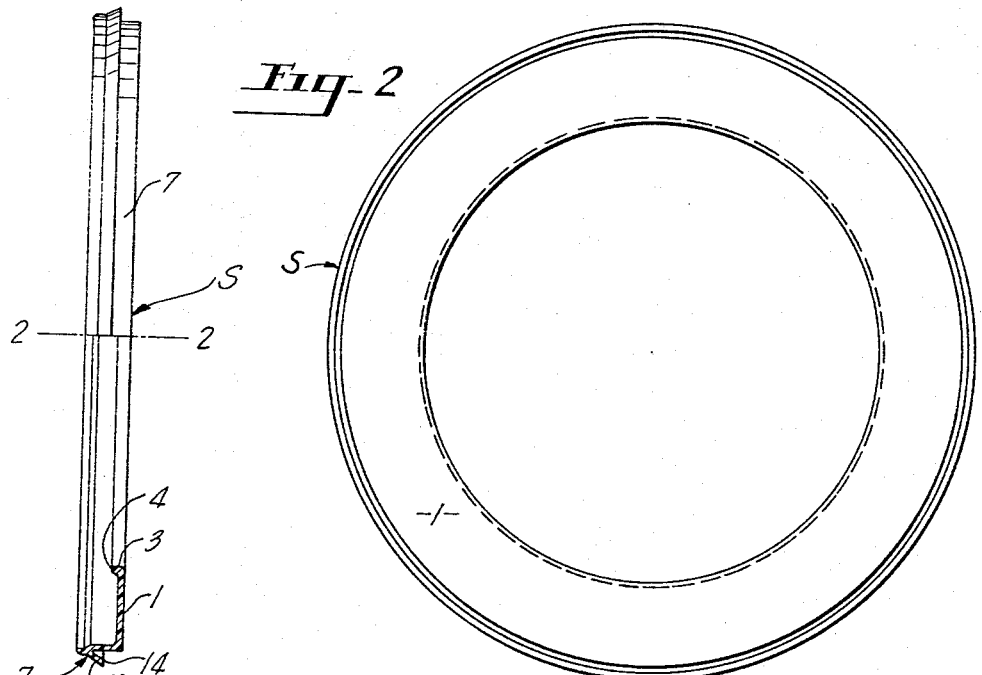
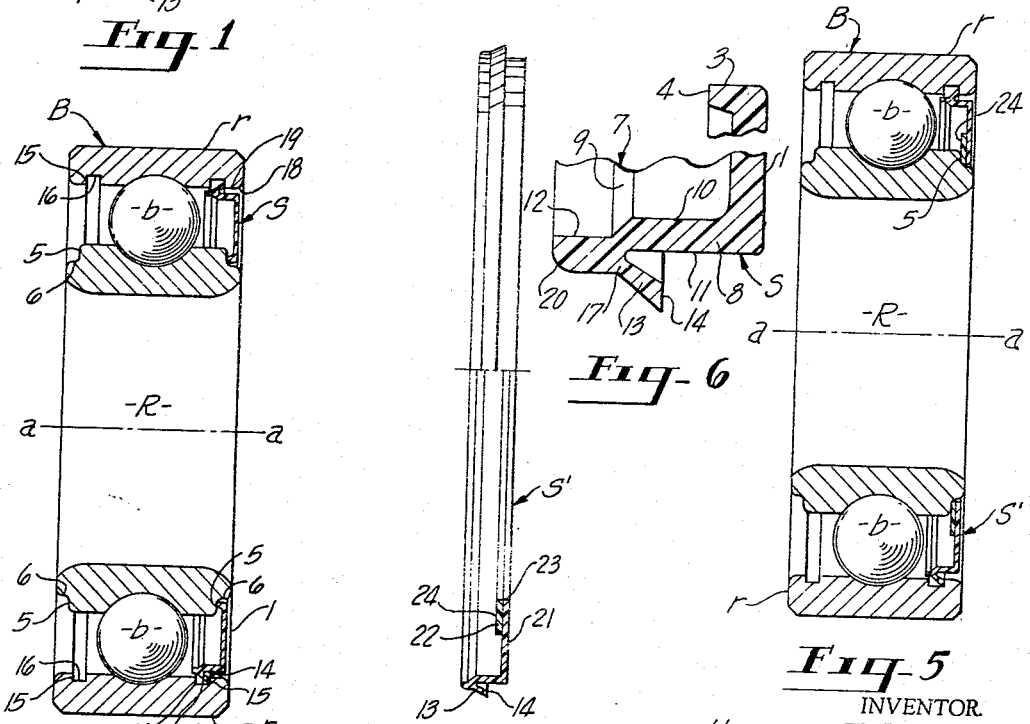
INVENTOR.
HERBERT T. DRAUDT
BY
ATTORNEYS

United States Patent Office 3,276,826
Patented Oct. 4, 1966

**3,276,826
BEARING SEAL**
Herbert T. Draudt, 3612 Clague Road,
North Olmstead, Ohio
Filed Oct. 23, 1963, Ser. No. 318,350
4 Claims. (Cl. 308—187.2)

This invention relates to seals such as retain lubricant in, and keep dirt out of, places and spaces between relatively moving things, and more particularly, and for example, to seals for retaining lubricant in, and excluding dirt from, ball, roller or other frictionless bearings.

The problem of sealing ball bearings, for example, has been longstanding and much aggravated by space limitations. Moreover, prior seals that were small and could be conveniently snapped into place tended to wear rapidly and/or fail to seal, while seals that were big enough to function well were costly and generally so large as to be useless, or require costly redesign and enlargement of the bearings for accommodation. Another aspect of the prior ball, or frictionless, bearing seal has been that prior efforts to effect economy of space and cost with quick-attachable, or so-called snap-in, seals have strained or stressed the attached seals with forces that tended to distort the seals and/or destroy the desired sealing contact with the bearing races at the sealing places.

It is among the objects of my invention to solve these problems and provide a seal of eminently simple form in which adequate sealing stresses may be developed and maintained for long-lasting, low-friction sealing, which stresses, however, will develop and provide desirable running and static seals without deleterious distortions or loss of sealing efficiency. It is also within my objects to provide a seal that may be easily assembled with or attached to the bearing with which it has its purpose and function, and also to provide such a seal that is well adapted to be assembled by rapidly acting, mechanical and/or automated means. Another object is to provide a seal having the virtues, and freedom from vices, mentioned above which may be easily and cheaply made, put to its intended use and employed.

These and other objects and advantages will more fully and at large appear from the following description of a preferred and exemplary form and embodiment of my invention, reference being made to the accompanying drawings in which—

FIGURE 1 is a side elevation, partly in longitudinal section of a seal, or sealing element, embodying my invention.

FIGURE 2 is a front, or exterior face, elevation of the seal of FIGURE 1 as viewed from the right of FIGURE 1.

FIGURE 3 is a longitudinal section of a ball bearing with one of my seals attached thereto in operative relation to the races and balls, on the right side as viewed, and exposing the open places for attachment and coaction between the seal and the races on the left side of the figure, as viewed.

FIGURE 4 is a view corresponding to FIGURE 1 of a modified form of seal embodying my invention.

FIGURE 5 is a view corresponding to FIGURE 3 with, however, the seal of FIGURE 4 substituted for the seal of FIGURE 1, and FIGURE 6 is an enlarged, fragmentary, broken section of the lower part of the seal shown in FIGURE 1.

As shown in the drawings my seals S, FIGURE 1, and S', FIGURE 4, are attached to, assembled with, and coact with the inner and outer races R and r respectively of ball bearings B to enclose and seal off the place and space for the balls b of the bearing.

Although only one seal is shown in each of the bearings it will be understood that two seals are ordinarily intended to be used and are provided for with each bearing. Preferably the seals S and S' are molded and made of polypropylene in sizes including those shown in the drawings, taking the drawings about at full size scale, and proportioned about as suggested therein and in the dimensioned example below, whence it will be understood that the seals have, for their best operation and function according to my present experience and understanding, strength, toughness, long-lived resilience, and low friction contact with smooth machined steel surfaces as the same may be conveniently turned in the races R and r as shown, FIGURES 3 and 5. Preliminarily it will also aid understanding of my invention to notice that each of my seals in its working relation to the races R and r has opposed, stressed, axial contact with oppositely facing surfaces of the respective races, but is free from appreciable, or deleterious, stressed radial contact with either of the races.

Referring now more particularly to FIGURES 1, 2 and 6, the seal S takes the form of a greatly and centrally apertured disc or a radially extensive, thin-walled ring having a flat radial web 1 normal to the axis 2—2 of the seal and extending radially about as far as the radial dimension of the space to be sealed between the two races, see FIGURE 3. The radially inward margin 3 of the web is thickened axially and turned rearwardly (i.e. axially toward the interior of the bearing when in use) for a limited extent and given a small smooth, radially disposed, annular, race-contacting and sealing face 4 which usually and preferably will be the running seal and have a close, stressed sliding contact with the annular, substantially planar, forwardly (i.e. axially toward the outside of the bearing) facing surface 5 of one of the notches 6 turned in the ends of the cylindrical face of the inner race R of the bearing B which has, for reference, its axis of revolution a—a. I prefer that the seal have exclusive contact and engagement with the race R axially between the smooth radial faces 4 and 5.

The radially outward portion 7 of the seal S has relatively great axial depth, has a quick-attachable, snap-in connection with the outer race r, has stressed fluid-sealing engagement therewith, which may be static or running, and is contrived and proportioned to develop axially stressed engagement between the seal and both races of the bearing.

The portion 7 of the seal, see FIGURE 6, comprises an axially long, forwardly disposed cylindrical part 8 about as thick as the web 1 and has, preferably, true cylindrical interior and exterior surfaces 10 and 11. The part 8 has strength in tension and is integrally joined to the web 1 to which it transmits the axial sealing force between the seal and the races. Rearwardly the part 8 is internally beveled off at 9, and reduced in thickness and integrally joined with a rearmost relatively thick cylindrical part 12 and joined re-entrantly with the thinner more flexible, forwardly and outwardly disposed, reverse-tapered, conically formed, latching and sealing element 13 whose forward smooth, substantially planar, radial face 14 makes sealing, and/or sliding and sealing contact, with the radial smooth, rearwardly-facing, substantially planar face 15 of one of the grooves or channels 16 which are cut in the radially inward cylindrical surface of the outer race r of the bearing. As in the relationship between the faces 4 and 5 mentioned above, I prefer that the only substantial or appreciably stressed contact between the seal, particularly the portion 7 thereof, and the outer race r be confined to the radial surfaces 4 and 5 so that the seal be substantially free from deforming or deleterious radial stresses and from radial contacts tending to induce harmful radial stresses. As suggested in FIGURE 3, however, the radially outermost corner, i.e. circular edge, of the latching element 13 preferably has partial, yielding, centering contact with the bottom of the groove 16 tending to space the relatively less yielding portions 3 and 7 from radial contact with the respectively adjacent races R and r, approximately as shown in FIGURE 3.

As best shown in FIGURE 6, the latching element 13 is thin and/or relatively flexible at its root 17 where it joins the stouter parts of the portion 7 of the seal. The element 13 is yielding enough in its form and substance in relation to the forward rounded corner 18 and cylindrical surface 19 of the race r, forwardly of the groove 16, to permit the seal to enter the race in response to axial bodily force and motion applied near the portion 7, and by the resilient recovery and the memory of the element 13, not unaccompanied by similar, if specifically different, functions and operations in and of the portion 7 in gross, to become latched in the groove 16 as the element 13 snaps out into the groove, as shown in FIGURE 3.

The internal stress developed in the seal incident to forcing the portion 7 into the outer race whilst the portion 3 is held against entry into the inner race, puts the faces 4 and 5, and the faces 14 and 15 into stressed sealing contact and into securely latched and attached engagement. Those skilled in the art will appreciate that this sealing stress within the seal S requires a change of shape, not shown, of the seal as between its detached state, FIGURE 1, and its attached and stressed state, FIGURE 3 which I have not undertaken to illustrate in particular. It may be taken, however, as within my observation and understanding that a desirable stress for the successful working of my invention will be largely reflected in the relative flatness and conicalness of the web 1, the relative cylindricalness and conicalness of the portion 7, and the relative right angledness of the connection between the web and the portion 7, all having regard to the resilient stiffness and strength of the seal and the several parts thereof. Stressed deflection of these parts of my seal is accommodated by the relatively bendable or substantially "hinged" connection of the latching element 13 to the main body of the seal at the root 17, and accommodated at the place of contact between the faces 4 and 5 by the smallness of the radial dimensions thereof and persistance of a sealing contact whether it be no more than in initial circle or any greater area. The surface 4 may be curved a little to slight torus shape to aid this accommodation, but it seems not to be critical to the enjoyment of the main precepts of my invention.

The channels or grooves 16 are cut into the inner cylindrical surface of the outer race r far enough away from the balls b to provide clearance between the axial innermost or rearmost portion of the seal, i.e. the end of the part 12 thereof, and the grooves are spaced rearwardly from the exposed ends of the race far enough to afford substantial structural strength and re-enforcement for the surface 15 to facilitate the cutting of the groove on the one hand, and to coact with the seal in axial opposition thereto on the other hand. The grooves 16 are preferably rectangular, as shown in the drawings albeit, the essential function of each of the grooves is to provide the radial sealing surface 15 of desirable depth to accommodate the coacting surface 14 of the seal and also to afford working space for the latching element 13 free from radial contact with the race, excepting the line centering contact mentioned above.

The facility of attachment and installation of the seal S to and in the bearing B is such as to invite doing the same by automatic machinery. As suggested in FIGURE 3, the seal S may, in the first instance, be merely centered in respect to the outer race by a preliminary centering contact between the exterior surface of the part 12 of the seal with the small cylindrical inner face of the race; this centering being encouraged by the rounded corner 18 of the race and the rounded corner 20 of the part 12 of the seal, see also FIGURE 6. With the seal thus preliminarily centered and coaxially aligned with the bearing, a straight axial push exerted upon the web 1 near the cylindrical portion 7 will press the seal rearwardly into the race until firstly, the face 4 contacts the face 5 of the inner race R; secondly, the web is thereafter deflected with its radially outward portion being pushed more rearwardly into the outer race whilst the radially inward part 3 of the seal is restrained by contact with the inner race; then thirdly, when the desired axial stress has been developed within the seal, as the same will have been predetermined by the dimensions and proportions of the parts involved, the pushing will have contiued until the extremity of the latching element 13, with its face 14, passes the last rearward increment of the surface 19 and snaps into the groove 16.

Unless the seal is intended to be employed exclusively for the exclusion of foreign matter from the bearing; it will be appreciated that the bearing may be lubricated before either one or both seals are attached thereto. It will also be understood that a pair of the identical seals S will be inserted in and attached to the bearing B in FIGURE 3 to enclose and isolate the space occupied by and adjacent the balls b and the lubricant therefor. In operation the pairs of faces 4 and 5 of less diameter, and 14 and 15 of greater diameter, will be stressed in mutual contact and axial opposition with gross and unit pressure sufficiently great to perform desirable sealing and retaining functions and sufficiently light to avoid unnecessary friction between the faces which have sliding contact. Ordinarily the faces of lesser diameter are expected to have sliding contact while the faces of greater diameter have static engagement. In my seal this makes little or no difference. The accidents and incidents of frictional values as between molded polypropylene, or similar plastics, and machined and hardened steel may invite either pair of the contacting faces to slide more or less than the other without significant harm or advantage. The axial pressure between the said pairs of sealing faces will in the first instance be governed by the amount of stressed resilience that is developed in the seal to "trap" the latch 13 in the groove 16. Thereafter wear, tempered by persistent lubricant, will tend to diminish the initial pressure down to the desirable, long-lived state of balance between low friction and efficient sealing that will tend to persist and continue indefinitely.

While the form and substance of my seal insures its retention in the bearing indefinitely, its removal, when desired, is easily done as, for example by the insertion of a smooth thin instrumentality between the cylindrical surfaces 11 and 19, and flexing at least an initial part of the portion 7 radially inwardly, and perhaps a bit rearwardly, enough to release the latch 13 from the groove 16 progressively and forwardly until the seal is detached.

To illustrate my present best preferred form of my invention more concretely, approximate dimensional values for certain seals like the seal S herein, made of polypropylene, which I have tested successfully, are these: The maximum diameter of the outermost circular edge of the latch 13 was 2.440" in a seal whose maximum axial dimension at the portion 7 was 0.190" and whose minimum internal diameter at the part 3 was 1.685", the latter extending axially 0.050". In this seal the external diameter of the surface 11 of the part 7 was 2.350" and the external diameter of the part 12 was 2.390". The wall thickness of the part 1 was 0.30" and of the parts 10 and 12, 0.025", and the thickness of the other parts varied, were rounded and tapered as shown proportionately in FIGURE 6, wherein, however, the face 14 was disposed 0.070" behind the forward face of the part 1 of the seal, in its idle state, and the latch 13 inclined at 21° from the axis a—a for 0.030" on its inner side and 27° for 0.045" externally. The face 14 measured 0.025" radially and the face 4 measured no more than 0.015" radially. In these proportions and in this size seals made of polypropylene were found satisfactory as were also seals of polyamide plastics; the latter having advantage at elevated temperatures. In these seals of these dimensions the surface 14 was forcibly deflected about 0.003" to about 0.010" rearwardly into the bearing after the faces 4–5 made full contact to permit the latch 13 to enter the channel 16 and make sealing contact between the faces 14–15. The axial force developed by such deflection has provided, as I have presently observed, sufficient axial stress in the seal and between the faces 4–5 and 14–15 to give the seal its intended function and effect. Since manufacturing tolerances between the surfaces 5 and 15 may be about 0.005", and subject to increase as the bearing wears, a virtue of my seal is that it is adaptable to a range of deflections without developing deleteriously high pressures between the sealing faces, nor fail to get and retain sufficient pressure for satisfactory sealing action.

The modified form of my invention embraced in the seal S' of FIGURES 4 and 5 is the same as my preferred form in all respects except at and adjacent the inner margin thereof, of, the portion 3 of the seal S. New reference characters are given to the different parts only. In the seal S' the web 21 has a straight uniform wall thickness inwardly to its radially inner peripheral edge 23, but in lieu of the integral rearward extension of the part 3 of the seal S, the seal S' has a washer 22 adhesively secured to the inner rearward face of the web 21 and has a smooth rearwardly facing face 24 engageable with the radial face 5 of the inner race R of the bearing. For a given bearing and a given seal the thickness chosen for the washer 22 will establish or govern the stressed deflection between the sealing surfaces 14 and 24 when the latter have found their engagements with the surfaces 5 and 15 of the races R and r, respectively, after the seal has been snapped in to its attachment with the bearing.

The choice afforded by selecting washers 22 of different thickness and/or different material from the remainder of the seal S' permits production in one mold of all of the seal S' except the washer 22 of a variety of different materials, as different operating conditions such as temperature, humidity etc. may require, and then stressing them differently in identical bearings, as may be most advantageous, with washer 22 of different thickness. Other choices will be apparent. The frictional value of the washer 22 may be desirably different from that of the rest of the seal in some circumstances, and it may be chosen to insure static or sliding contact with the inner race if either should be particularly desired.

My avowed preference for plastic materials for the substance of my seals must not be taken as a disclaimer of any material that may be appropriate and useful for the practice of my invention within the precepts and teachings of this specification. For instance: In this description I have assumed that the races of the bearing would be made of steel wherefore polypropylene is compatible, but my invention is not limited to bearings made of steel nor to material incompatible with polypropylene or any other plastic. The frictional compatibility of iron and steel with brass and various bronzes as well as the costs and other advantages and disadvantages of such materials for my purposes will illustrate to those skilled in the art the order of choice that may be indulged in within the principles and precepts of my invention.

While I have illustrated and described a preferred and one modified form of my invention, and given my best description of its operation and advantages, changes, improvements and modifications will occur to those skilled in the art who come to understand my teachings in these premises. Therefore, I do not care to be limited in the scope of my patent to the form or forms of my invention herein specifically illustrated and described, nor in any other fashion inconsistent with the progress by which my invention has promoted the art.

I claim:

1. An anti-friction bearing having opposite axial ends and comprising in combination:

inner and outer annular races which are relatively moveable about a common axis which races define an annular chamber with opposite axial ends between said races for bearing members and lubricant, one of said races having an annular groove facing toward said chamber near one end thereof, said groove having a smooth, radial annular surface facing axially inwardly, the other of said races having a smooth radial annular surface adjacent one axial end thereof facing axially outwardly and away from said chamber; and, an annular resilient seal coacting with said races adjacent one axial end of the bearing and closing said one end of the lubricant chamber at said end of said bearing, said seal having an axis adapted to coincide substantially with the axis of the bearing and comprising an annular resilient web with one portion lying substantially normal to said axis with another portion lying proximate and spaced from said one of said races and comprising a coaxial resilient substantially cylindrical portion integrally joined with the said one portion of said web and extending toward the chamber, said web having a circular marginal portion radially remote from the said cylindrical portion with a smooth annular surface facing inwardly toward said chamber and having smooth, resiliently stressed sliding contact with the said smooth outwardly facing surface of said other race, the said cylindrical portion of said seal having a reversed, smooth annular surface radially offset from said cylindrical portion and facing axially away from said chamber and having stressed resilient sliding engagement with the said inwardly facing surface of the groove of said one race.

2. The bearing according to claim 1 wherein all other surfaces and portions of said seal are spaced from substantial contact with said races when the axes of the seal and races coincide whereby said seal has substantially exclusive engagement with said races upon said radial surface of said grooves and said smooth outwardly facing surface.

3. The bearing according to claim 1 wherein the said smooth annular surfaces of said seal are deflected axially relative to their unstressed relationship to each other a distance from about 0.003" to about 0.010" when in sealing engagement with the said surfaces of said races to maintain resilient sealing contact therebetween.

4. The bearing according to claim 1 wherein said reversed, smooth annular surface is flexibly connected to said cylindrical portion to snap into said groove.

References Cited by the Examiner

UNITED STATES PATENTS

| | | | |
|---|---|---|---|
| 2,237,616 | 4/1941 | Smith | 308—187.2 |
| 2,275,325 | 3/1942 | Searles | 308—187.2 X |
| 2,299,590 | 10/1942 | Reynolds | 277—90 |
| 2,699,366 | 1/1955 | Heinrich | 277—90 X |
| 2,755,113 | 7/1956 | Baumheckel | 277—94 |
| 2,757,052 | 7/1956 | Spurgeon | 308—187.1 |
| 2,834,616 | 5/1958 | Gerbert. | |
| 3,113,814 | 12/1963 | Ogura | 308—187.2 |
| 3,114,559 | 12/1963 | Miglietts | 277—94 |

FOREIGN PATENTS

| | | |
|---|---|---|
| 613,990 | 2/1961 | Canada. |
| 864,678 | 5/1951 | France. |
| 978,288 | 4/1951 | France. |
| 1,221,175 | 5/1960 | France. |
| 631,981 | 11/1940 | Great Britain. |

DAVID J. WILLIAMOWSKY, *Primary Examiner.*

DON A. WHITE, *Examiner.*

L. L. JOHNSON, *Assistant Examiner.*